(12) United States Patent  
Newberry et al.

(10) Patent No.: US 9,284,701 B1
(45) Date of Patent: Mar. 15, 2016

(54) AUTOMATED GUIDED VEHICLE POSITIVE STOPPING SYSTEM

(71) Applicant: Toyota Motor Engineering & Manufacturing North America, Inc., Erlanger, KY (US)

(72) Inventors: David W. Newberry, Gallipolis, OH (US); John A. Holt, Morgantown, WV (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/492,383

(22) Filed: Sep. 22, 2014

(51) Int. Cl.
*E01F 13/04* (2006.01)

(52) U.S. Cl.
CPC ...................... *E01F 13/04* (2013.01)

(58) Field of Classification Search
CPC ...................................... E01F 13/04
USPC ........................................... 701/23
See application file for complete search history.

(56) References Cited

U.S. PATENT DOCUMENTS

| RE31,393 | E | 9/1983 | Rosen | |
|---|---|---|---|---|
| 4,530,056 | A | 7/1985 | MacKinnon et al. | |
| 8,509,981 | B2 | 8/2013 | Pfeiffer | |
| 2012/0303190 | A1* | 11/2012 | Pfeiffer | G05D 1/0225 701/22 |
| 2014/0331889 | A1* | 11/2014 | Huelsmann et al. | B61B 13/00 104/287 |

FOREIGN PATENT DOCUMENTS

| EP | 473910 | 3/1992 |
|---|---|---|
| JP | 08188241 | 7/1996 |
| JP | 2000044047 | 2/2000 |

* cited by examiner

*Primary Examiner* — Rodney Butler
*Assistant Examiner* — Brian P Sweeney
(74) *Attorney, Agent, or Firm* — Dinsmore & Shohl LLP (57) ABSTRACT

A positive stopping system with an adjustable stopper apparatus positioned along an automated guided vehicle navigation pathway. The adjustable stopper apparatus includes a linear actuator moveable between an extended position and a retracted position. A stopper end is coupled to the linear actuator. The stopper end is positioned within the automated guided vehicle navigation pathway when the linear actuator is in the extended position and removed from the automated guided vehicle navigation pathway when the linear actuator is in the retracted position.

20 Claims, 11 Drawing Sheets

AUTOMATED GUIDED VEHICLE POSITIVE STOPPING SYSTEM

TECHNICAL FIELD

The present disclosure is generally directed positive stopping systems for automated guided vehicles.

BACKGROUND

Automated guided vehicles (AGVs) are used in factory environments to assist with inventory management by transporting parts from one area of the factory to another. For example, parts may be loaded on an AGV in a staging area. Once the parts are loaded, the AGV may drive to an assembly area where the parts are unloaded and used in assembly processes. The AGV may travel from the staging area to the assembly area based on a control system and without intervention from users.

In some environments, robots may be used to load and/or unload parts from the AGVs. To facilitate reliable unloading of the parts from the AGVs, the position of the AGVs relative to the robots should be accurate and repeatable. Previously, AGVs would drive to stations affixed to the floor of the factory and automatically stop at a predetermined stopping location. However, the automatic stop may be unreliable, causing the AGVs to overrun the conveyor station. This unreliability may harm the efficiency of the AGVs. Further, failure to stop at the predetermined location may initiate a fault that forces the AGVs to become inoperable. Accordingly, positive stopping systems for AGVs may be desired.

SUMMARY

In one embodiment, positive stopping system includes an adjustable stopper apparatus positioned along an automated guided vehicle navigation pathway. The adjustable stopper apparatus includes a linear actuator moveable between an extended position and a retracted position. A stopper end is coupled to the linear actuator. The stopper end is positioned within the automated guided vehicle navigation pathway when the linear actuator is in the extended position and removed from the automated guided vehicle navigation pathway when the linear actuator is in the retracted position.

In another embodiment, an automated guided vehicle system includes an automated guided vehicle having a vehicle frame, a drive mechanism, a sensing head, and a stop block coupled to the vehicle frame. The automated guided vehicle system further includes a conveyor station having a conveyor frame and an adjustable stopper apparatus mounted on the conveyor station. The adjustable stopper apparatus includes a linear actuator moveable between an extended position and a retracted position. A stopper end is coupled to the linear actuator. The stopper end is positioned within the automated guided vehicle navigation pathway when the linear actuator is in the extended position and removed from the automated guided vehicle navigation pathway when the linear actuator is in the retracted position. When the linear actuator is in the extended position, the stopper end is engageable with the stop block of the automated guided vehicle. Further, when the linear actuator is in the retracted position, the automated guided vehicle navigation pathway is clear and the automated guided vehicle can travel in a forward direction without obstruction.

In yet another embodiment, a method of navigation assistance includes extending an adjustable stopper apparatus linear actuator into an automated guided vehicle navigation pathway where the adjustable stopper apparatus is coupled to a conveyor station and approaching the conveyor station with an automated guided vehicle following the automated guided vehicle navigation pathway. The automated guided vehicle includes a vehicle frame, a drive mechanism, a sensing head, and a stop block coupled to the vehicle frame. The method of navigation assistance also includes engaging the stop block of the automated guided vehicle with the linear actuator of the adjustable stopper apparatus, stopping the automated guided vehicle, and retracting the linear actuator of the adjustable stopper apparatus from the automated guided vehicle navigation pathway.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to adjustable stopper apparatuses positioned near conveyor stations and navigation pathways. The adjustable stopper apparatuses are moveable between an extended position to provide a positive stop for an AGV following along an AGV navigation pathway and a retracted position to remove obstruction from the AGV navigation pathway, allowing the AGV to exit the conveyor station without changing direction. When an AGV drives into an adjustable stopper apparatus positioned in the extended position, a stop block mounted on an AGV frame comes into contact with portions of the adjustable stopper apparatus. This contact stops the AGV and accurately and repeatably locates the AGV for a part loading and unloading process. When the AGV is prepared to leave the conveyor station, the adjustable stopper apparatus is repositioned into a retracted position. The retracted position of the adjustable stopper apparatus provides clearance to allow the AGV to continue to follow a pre-determined path along a forward direction of travel. Allowing the AGV to continue along the forward direction of travel, and therefore not requiring the AGV to sequentially reverse or alter the direction of travel, increases the predictability of behavior of movement of the AGV.

Figure 1:
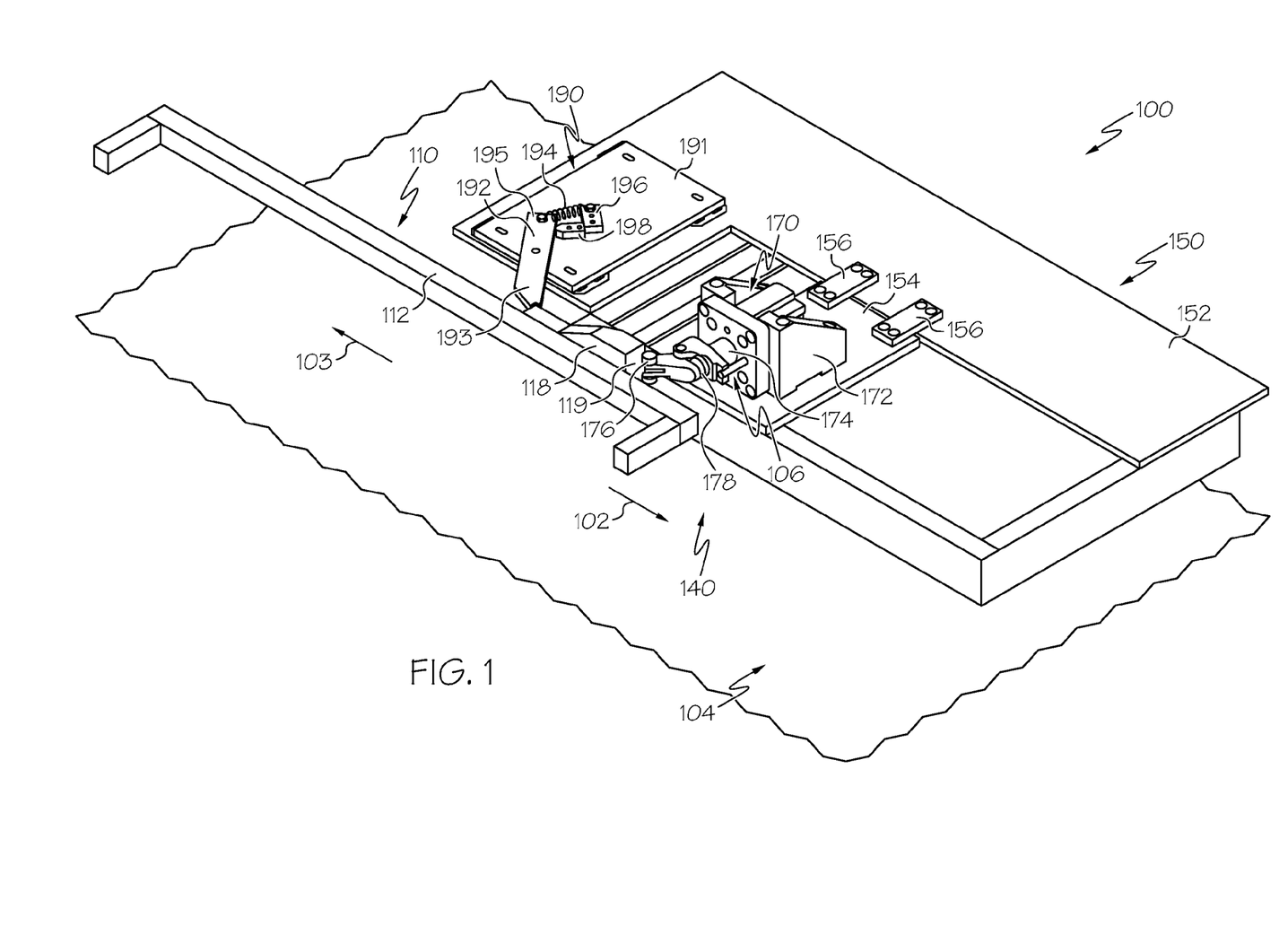
FIG. 1 depicts a perspective view of an AGV system including an AGV, a conveyor station, and an adjustable stopper apparatus in an extended position according to one or more embodiments described herein.
Figure 2:
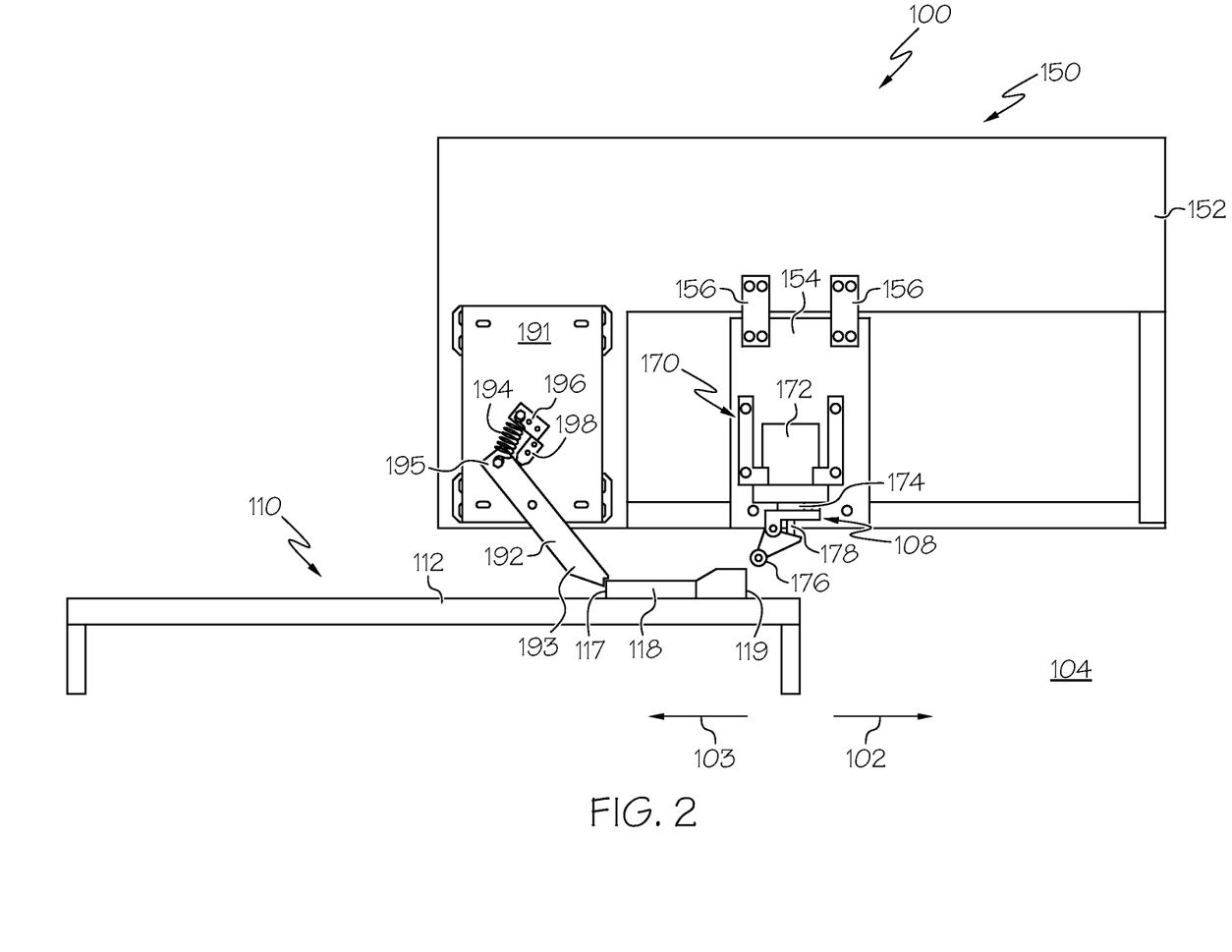
FIG. 2 depicts a perspective view of an AGV system including an AGV, a conveyor station, and an adjustable stopper apparatus in a retracted position according to one or more embodiments described herein.

Referring now to FIGS. 1-2, an AGV system 100 is depicted. The AGV system 100 includes an AGV 110, a conveyor station 150, an adjustable stopper apparatus 170, and an anti-back mechanism 190. The AGV 110 is configured to travel along a factory floor 104 and follow an AGV navigation pathway 140. In FIGS. 1-2, the AGV 110 is positioned alongside the conveyor station 150. The adjustable stopper apparatus 170 is mounted on the conveyor station 150 and is positioned such that the adjustable stopper apparatus 170 can be moved between an extended position 106, positioned within an AGV navigation pathway 140 as depicted in FIG. 1, and a retracted position 108, removed from the AGV navigation pathway 140 as depicted in FIG. 2. The various components of the AGV system 100 are described in detail below.

Figure 3:
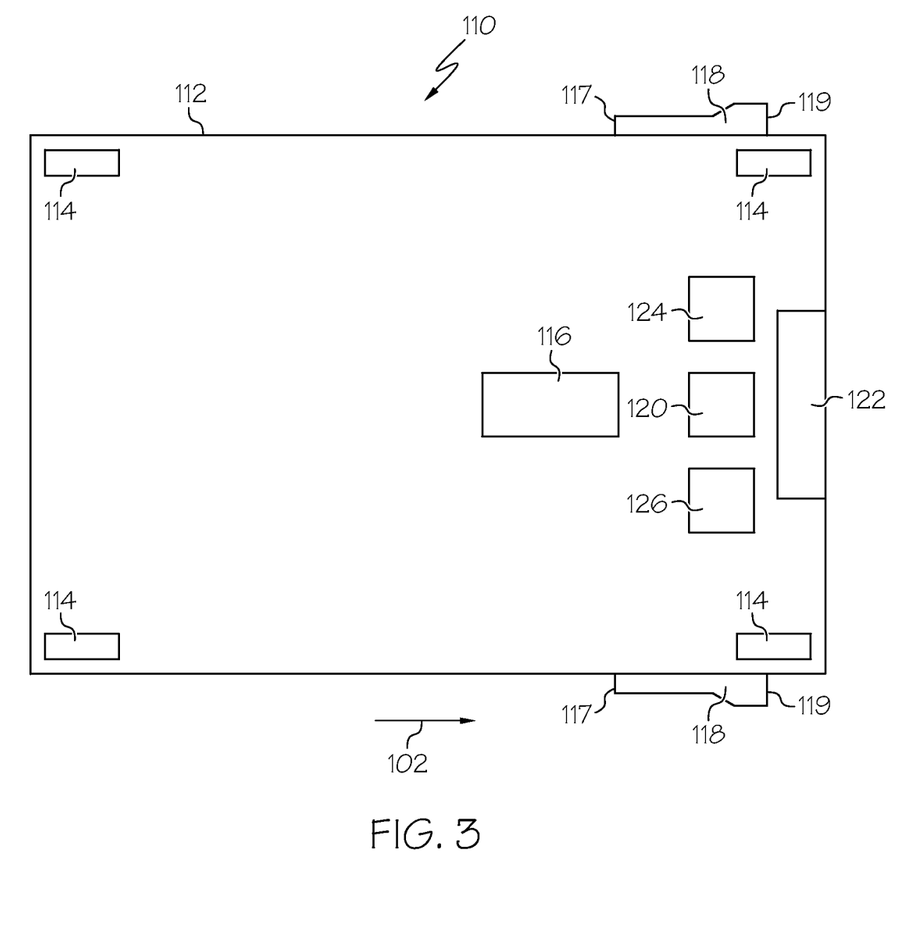
FIG. 3 depicts a schematic top view of an AGV according to one or more embodiments described herein.

Referring now to FIG. 3, the AGV 110 is schematically depicted in more detail. The AGV 110 includes a vehicle frame 112 and a plurality of wheels or casters 114 that are coupled to the underside of the vehicle frame 112 and support the AGV 110 as it moves about the factory floor 104 (FIG. 1). The AGV 110 also includes at least one drive mechanism 116 and at least one sensing head 122. In the embodiment depicted in FIG. 3, the drive mechanism 116 is controlled by a drive unit 120 and is configured to rotate and provide a directional drive force to the AGV 110 to translate the AGV 110 along the AGV navigation pathway 140. The sensing head 122 may be coupled to the AVG 110 and used to detect and follow the AGV navigation pathway 140 (FIG. 1). The casters 114 are free to rotate, but rotation of the casters 114 may or may not be controllable. Thus, direction of movement of the AGV 110 may be determined based on the direction of drive force applied by the drive mechanism 116.

The AGV 110 may include a programmable logic controller 126 (PLC) that contains communication and sensor controls. The PLC 126 may control or provide a start/stop switch, lane and status lights, route selector switches, a serial switch, an RF modem, an RFID reader and an IR I/O transmitter. Both the drive unit 120 and the PLC 126 may control or receive information from the sensing head 122. In some embodiments, the AGV 110 may further include a power switch, a bumper safety switch, an emergency stop switch, a chime box, a status light, and a speed controller. In some embodiments, the drive unit 120 and the PLC 126 are communicatively coupled. For example, the drive unit 120 may provide driving information (e.g., driving/not driving) and route detecting information (e.g., slow/stop tape detected) to the PLC 126, and the PLC 126 may provide turn information (e.g. right turn/no right turn) and speed setting information to the drive unit 120 to control the speed and direction of the drive mechanism 116. In some embodiments, the AGV 110 includes infrared and/or ultrasonic sensors to provide the AGV 110 with collision avoidance assistance.

Referring still to FIG. 3, the AGV 110 may further include an AGV communication device 124 that can communicate with the PLC 126. The AGV communication device 124 may be wireless and communicatively coupled to a wireless communications network, or other wireless sources, for example, a wireless network that conforms to an FL-net standard, or the like. In operation, the AGV communication device 124 may receive wireless signals from a plurality of location beacons (e.g., RFID tags) that provide the AGV communication device 124 with information regarding the location of the AGV 110 along the AGV navigation pathway 140 within a factory environment, a location of one or more conveyor stations 150 (FIG. 1), and a location of one or more obstacles. The speed and direction of the AGV 110 may be set based on the wireless signals that are received by the AGV communication device 124 from the location beacons and/or the PLC 126. As described in greater detail below, the AGV communication device 124 can also communicate with a conveyor station communications device 160 (FIG. 6A) when the AGV 110 is located at or near a conveyor station 150.

Referring now to FIGS. 1-3, the AGV 110 may further include one or more stop blocks 118 coupled to the vehicle frame 112 and extending from the side of the vehicle frame 112. The stop blocks 118 include an engagement surface 119 extending laterally from the vehicle frame 112. The engagement surface 119 is engageable with a stopper end 176 of the adjustable stopper apparatus 170 to stop the AGV 110, as described in more detail below. In some embodiments, the engagement surface 119 of the stop block 118 may extend between 30 mm and 50 mm from the side of the vehicle frame 112 such as, for example, 40 mm. The stop blocks 118 further include a rear surface 117 extending laterally from the vehicle frame 112 and providing a surface engageable with an anti-back mechanism 190, as described in greater detail below. In some embodiments, rear surface 117 of the stop block 118 may extend between 20 mm and 40 mm from the side of the vehicle frame 112, for example, 25 mm. The stop block 118 may comprise steel, however, any exemplary material is contemplated, for example, other metal alloys and plastics.

Figure 4:
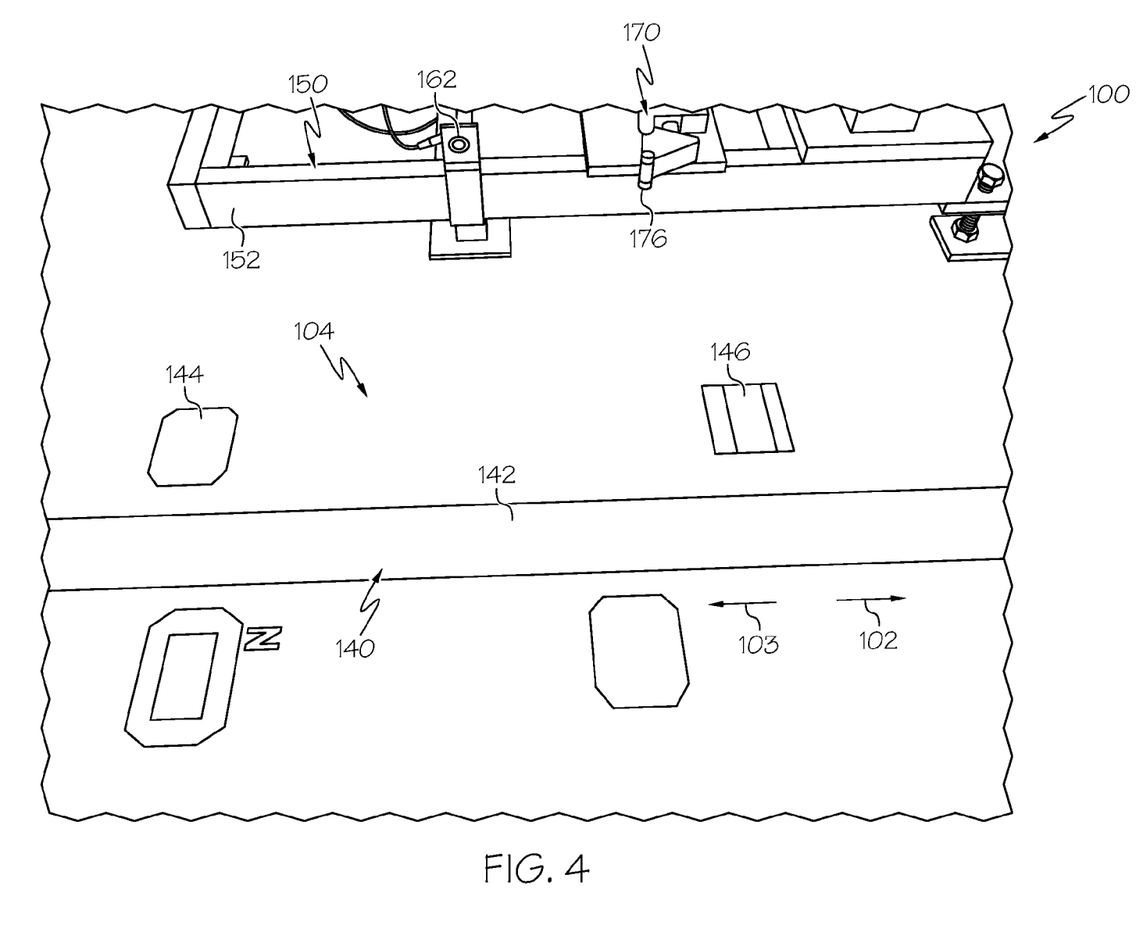
FIG. 4 depicts a perspective view of an AGV navigation pathway positioned along a conveyor station according to one or more embodiments described herein.
Figure 5:
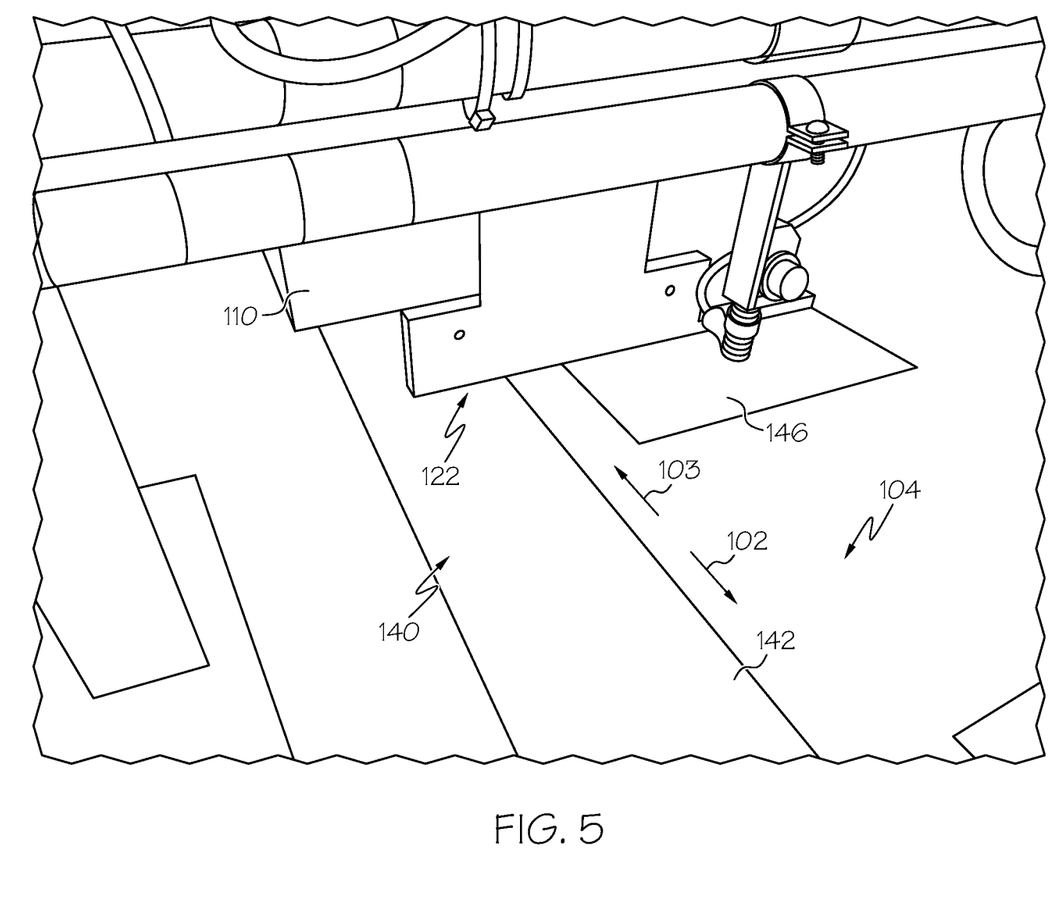
FIG. 5 depicts a partial view of an AGV on a navigation pathway according to one or more embodiments described herein.

Referring now to FIGS. 4-5, the AGV 110 may operate by following an AGV navigation pathway 140 that defines a pre-determined path of travel along the factory floor 104. The AGV navigation pathway 140 may include magnetic tape 142 or other detectable path components placed on the factory floor 104. The AGV navigation pathway 140 may also include one or more pieces of slow tape 144 and one or more pieces of stop tape 146. When the AGV 110 detects the slow tape 144, for example, with the sensing head 122, the AGV 110 reduces speed. When the AGV 110 detects the stop tape 146, for example, with the sensing head 122, the AGV 110 stops. The slow tape 144 may be positioned near the stop tape 146 such that the AGV 110 reduces speed as it approaches the stop tape 146. In alternative embodiments, the AGV navigation pathway 140 may include a wire that carries a radio frequency signal or a guide tape of a particular color. The AGV navigation pathway 140 may further include location beacons (e.g., RFID tags) that carry directional information that is receivable by the AGV 110.

The sensing head 122 of the AGV 110 may be used to detect the presence of the magnetic tape 142 and provide this information to the drive unit 120 or directly to the drive mechanism 116, allowing the drive unit 120 to guide the AGV 110 along the magnetic tape 142 using the drive mechanism 116. When the sensing head 122 reaches the slow tape 144, the sensing head 122 signals the drive unit 120 to reduce the speed of the AGV 110. When the sensing head 122 reaches the stop tape 146, the sensing head signals the drive unit 120 to stop the AGV 110. Any turns along the AGV navigation pathway 140 may be identified by the sensing head 122, which instructs the drive mechanism 116 to rotate to apply a force that tends to turn the AGV 110 to follow the AGV navigation pathway 140. It should be understood that one or more pieces of slow tape 144 and stop tape 146 can be located along the AGV navigation pathway 140, for example, at one or more conveyor stations 150 positioned along the AGV navigation pathway 140. Further, it should be understood that slow tape 144 and stop tape 146 can be positioned along the AGV navigation pathway 140 at locations that are not associated with the one or more conveyor stations 150. For example, slow tape 144 may be positioned at a location preceding a turn such that the AGV 110 can perform the turn without becoming misaligned from the AGV navigation pathway 140.

In some embodiments, the AGV navigation pathway 140 may be a loop pathway, such that the AGV 110 starts at a starting location, travels to one or more conveyor stations 150 and returns to the starting location while traveling in a forward direction of travel 102 along the AGV navigation pathway 140 such that a complete trip covers the length of the AGV navigation pathway 140 once. In other embodiments, the AGV navigation pathway 140 may be a bidirectional pathway, such that the AGV 110 travels from the starting location to a conveyor station 150 in a forward direction of travel 102 along the AGV navigation pathway 140 and returns from the conveyor station 150 to the starting location in a reverse direction of travel 103 along the AGV navigation pathway 140 such that a complete trip covers the length of the AGV navigation pathway 140 twice.

Figure 6A:
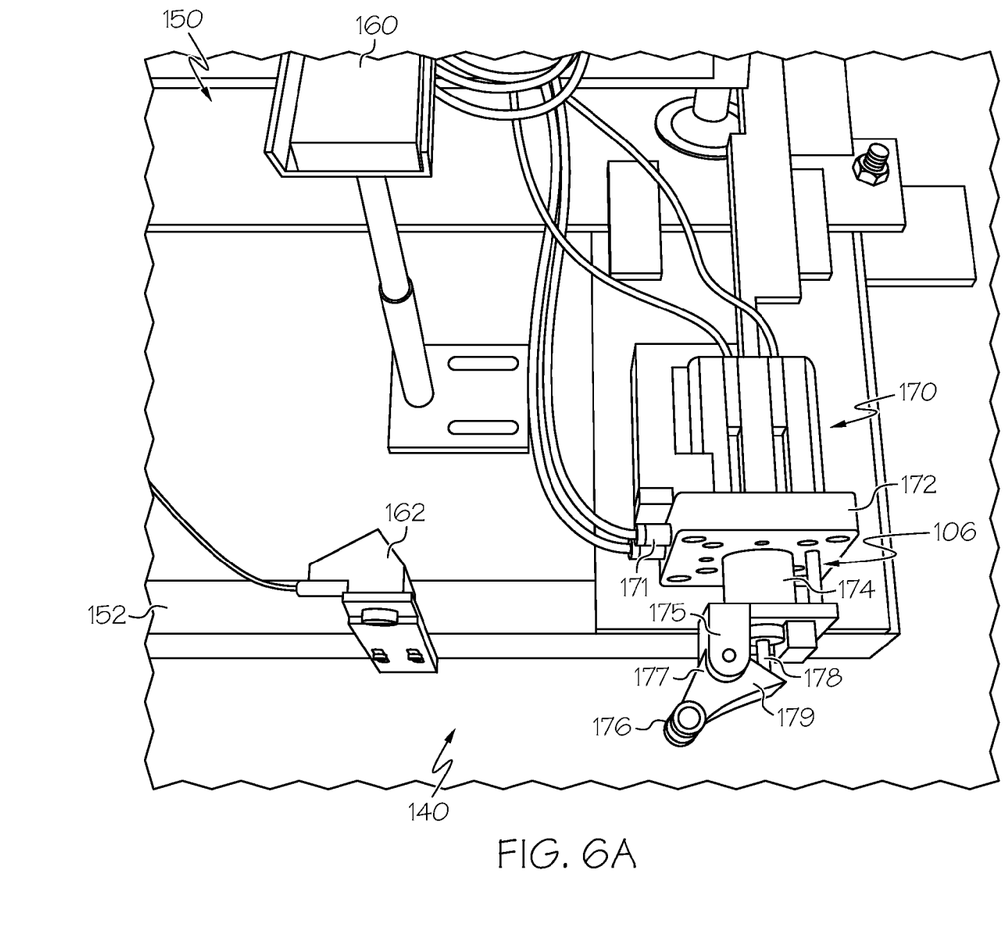
FIG. 6A depicts a top perspective view of an adjustable stopper apparatus in an extended position according to one or more embodiments described herein.
Figure 6B:
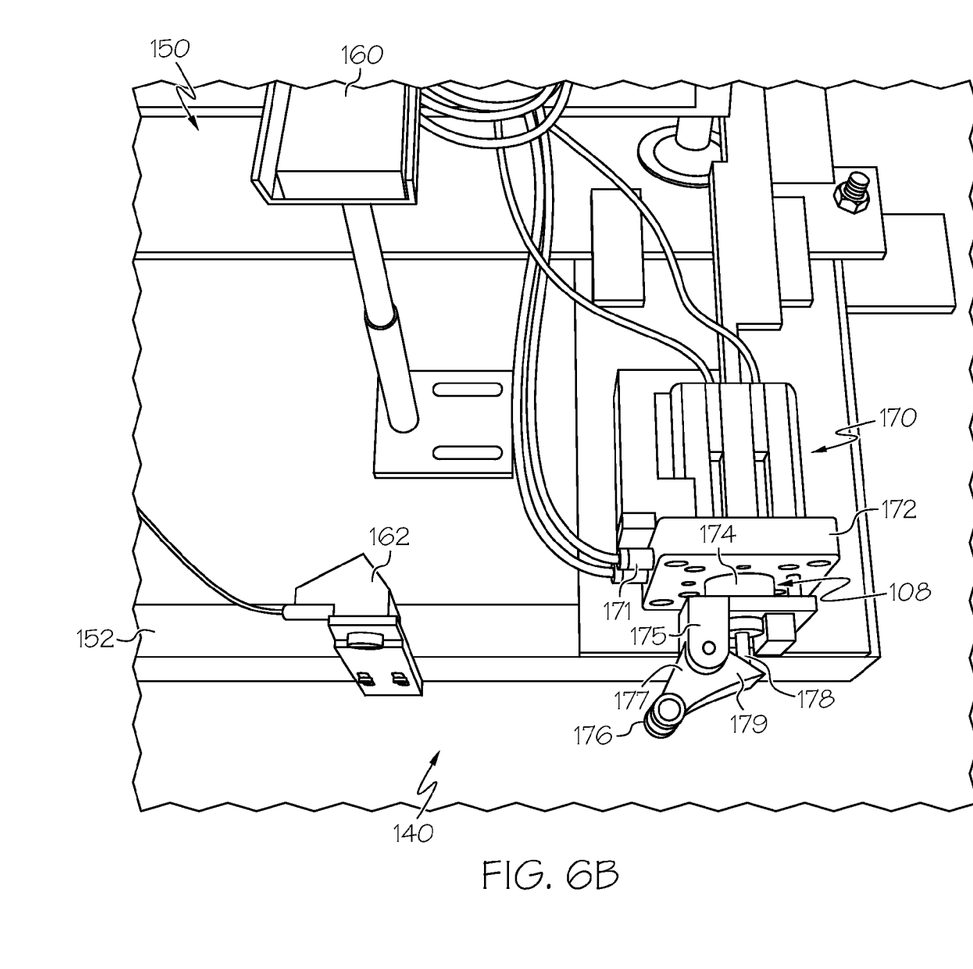
FIG. 6B depicts a top perspective view of an adjustable stopper apparatus in a retracted position according to one or more embodiments described herein.
Figure 8:
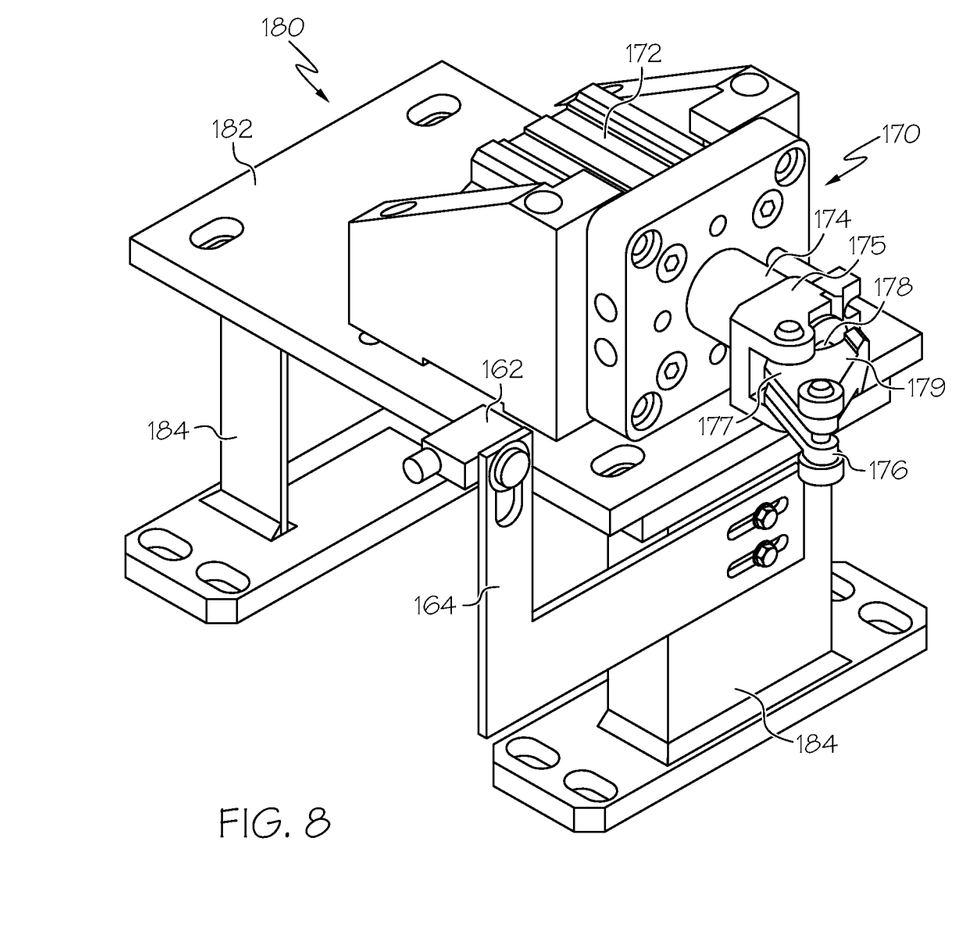
FIG. 8 depicts a standalone adjustable stopper apparatus according to one or more embodiments described herein.
Figure 9:
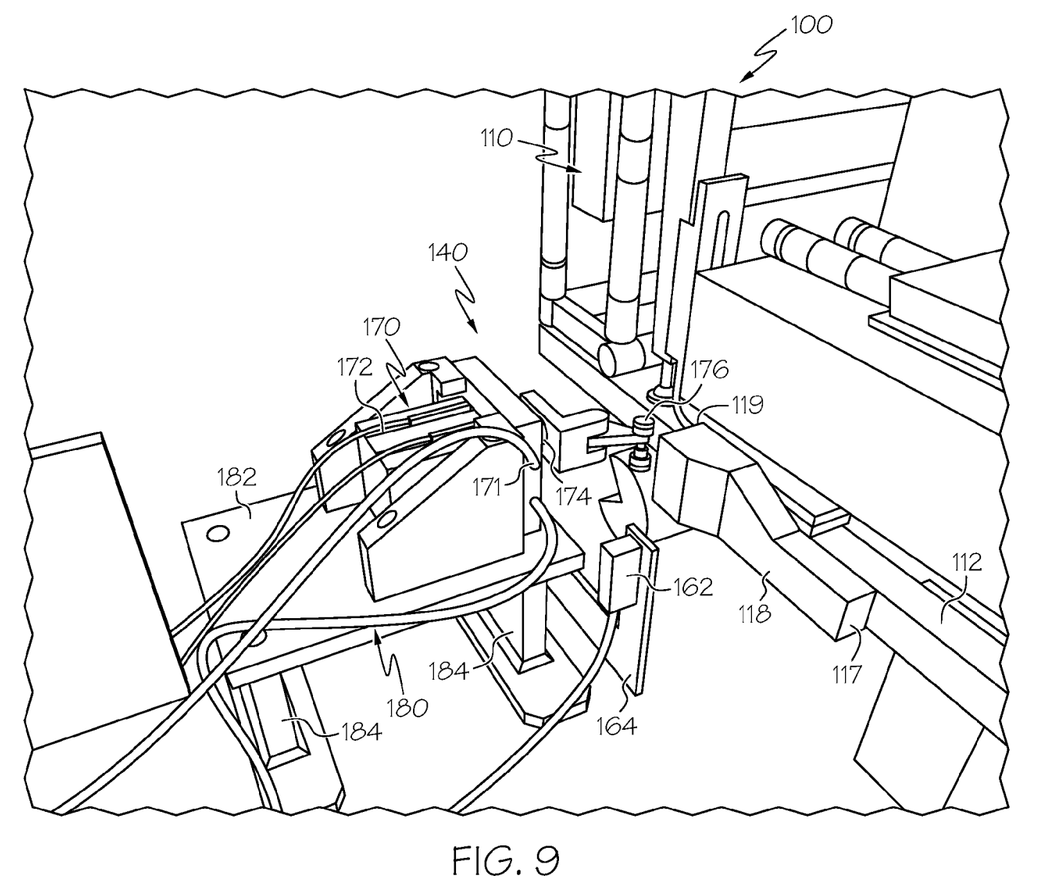
FIG. 9 depicts a perspective view of a standalone adjustable stopper apparatus and an AGV according to one or more embodiments described herein.

Referring now to FIGS. 6A-6B, the adjustable stopper apparatus 170 is depicted. The adjustable stopper apparatus 170 may be coupled to the conveyor station 150 or positioned near the conveyor station 150, for example, mounted on a standalone floor mount 180 (FIGS. 8-9). In some embodiments, the adjustable stopper apparatus 170 comprises a stopper cylinder 174 partially or wholly disposed within a stopper base 172 and coupled to a stopper end 176. The stopper cylinder 174 may be movable within the stopper base 172 such that the stopper cylinder 174 can extend and retract between the extended position 106 and the retracted position 108. The adjustable stopper apparatus 170 further includes an actuator 171 mechanically coupled to the stopper base 172, the stopper cylinder 174, and the stopper end 176. The actuator 171 may be any of a variety of linear actuators to facilitate linear motion of the stopper cylinder 174 and/or the stopper end 176, including a servo-mechanical actuator, an air pressure actuator, a hydraulic actuator, and/or the like. In some embodiments, the adjustable stopper apparatus 170 is an RSH Series or RSQ Series Stopper Cylinder by SMC Corporation™. In some embodiments, the actuator 171 is directly coupled to the stopper end 176. For example, the actuator 171 can extend and retract the stopper end 176 between the extended position 106 and the retracted position 108. In other embodiments, the actuator 171 itself can extend and retract between the extended position 106 and the retracted position 108.

Referring still to FIGS. 6A-6B, the stopper cylinder 174 may have a diameter of between about 45 mm and about 90 mm, such as, for example, 50 mm, 63 mm, or 80 mm. In operation, a larger stopper cylinder 174 may be able to withstand a large impact force, for example, impact from a large AGV 110. A smaller stopper cylinder 174 may be able to provide more sensitive dampening, which may reduce bounce back when an AGV 110 contacts the stopper end 176 coupled to the stopper cylinder 174. In some embodiments, the stopper cylinder 174 may comprise carbon steel, however, it should be understood that any exemplary material capable of providing a positive stop is contemplated, for example, other metal alloys and plastics. The stopper cylinder 174 may be a single-acting cylinder, a double-acting cylinder, or the like.

Referring still to FIGS. 6A-6B, the stopper end 176 is mounted on the end of the stopper cylinder 174. In some embodiments, the stopper end 176 may be pivotably coupled to a stopper end coupling device 175 positioned between the stopper end 176 and the stopper cylinder 174. The stopper end 176 may include a pivoting end 177 pivotably coupled to the stopper end coupling device 175 and a swinging end 179 coupled to a cushioning device 178. The cushioning device 178 may extend between the swinging end 179 and the stopper cylinder 174 or between the swinging end 179 and the stopper end coupling device 175. The cushioning device 178 may be configured to damper impact received by the stopper end 176. In operation, when impact is received by the stopper end 176, the stopper end 176 may pivot, pressing into the cushioning device 178 such that the cushioning device compresses the stopper cylinder 174. This compression dampens the impact received by the stopper end 176. In alternative embodiments, the stopper end 176 is directly coupled to the stopper cylinder 174.

The stopper cylinder 174 is depicted in the extended position 106 in FIG. 6A and depicted in retracted position 108 in FIG. 6B. When the stopper cylinder 174 is in the extended position 106, the stopper end 176 is positioned within the AGV navigation pathway 140 such that, for example, the stop block 118 of an AGV 110 (FIG. 1) following the AGV navigation pathway 140 can contact the stopper end 176, stopping the AGV 110. When the stopper cylinder 174 is in the retracted position 108, the stopper end 176 is removed from the AGV navigation pathway 140, such that an AGV 110 (FIG. 2) following the AGV navigation pathway 140 is unobstructed by the stopper end 176. The difference between the length of the stopper cylinder 174 that is removed from the stopper base 172 when in the extended position 106 and the length of the stopper cylinder 174 that is removed from the stopper base 172 when in the retracted position 108 defines a stroke distance of the adjustable stopper apparatus 170. The stroke distance should be large enough to extend the stopper end 176 into the AGV navigation pathway 140 and retract the stopper end 176 from the AGV navigation pathway 140. In some embodiments, the stroke is between 20 mm and 50 mm, for example, a 30 mm stroke or a 40 mm stroke.

Referring again to FIGS. 1-2 and 6A-6B, the adjustable stopper apparatus 170 may be coupled to the conveyor station 150. The conveyor station 150 includes a conveyor base plate 154 coupled to a conveyor frame 152 using two conveyor mounts 156 although any number of conveyor mounts 156 can be used. Further, the conveyor base plate 154 can be mounted to the conveyor frame 152 without the use of conveyor mounts 156. In some embodiments, the adjustable stopper apparatus 170 is mounted on the conveyor base plate 154. In some embodiments, the adjustable stopper apparatus 170 may be mounted directly to the conveyor frame 152.

The conveyor station 150 may further include a loading and unloading system configured to transfer goods between the conveyor station 150 and the AGV 110. The loading and unloading system of the conveyor station 150 may be manually operated or may include automated equipment, such as robots, or the like. It should be understood that the conveyor station 150 is configured to repeatably receive one or more AGVs 110 each traveling along the AGV navigation pathway 140. As an example and not a limitation, the conveyor station 150 may be located at an assembly station where the conveyor station 150 receives parts for assembly from each AGV 110 and transfers the parts to the assembly station where the parts are assembled.

The conveyor station 150 may include the conveyor station communications device 160 communicatively coupled to the AGV communications device 124 using a wireless connection. When the AGV 110 reaches a stopping location, (i.e. the location of the stop tape 146 and/or the location of the adjustable stopper apparatus 170) the conveyor station communications device 160 and the AGV communication device 124 transfer communications stating that the AGV 110 is aligned and ready for the loading and unloading process. Once the loading and unloading process is complete, the conveyor station communications device 160 sends a START signal to the AGV communication device 124 and the adjustable stopper apparatus 170. The START signal signals the adjustable stopper apparatus 170 to move into the retracted position 108 and signals the AGV 110 to move in the forward direction of travel 102 along the AGV navigation pathway 140.

Referring again to FIGS. 6A-6B, the conveyor station 150 further comprises an AGV presence sensor 162 mounted to the conveyor station 150. The AGV presence sensor 162 can be communicatively coupled to the adjustable stopper apparatus 170 either directly or through the conveyor station communications device 160. The AGV presence sensor 162 measures whether the AGV 110 is present at the conveyor station 150. If the AGV 110 is not present at the conveyor station 150, a signal is sent to the adjustable stopper apparatus 170 to move the stopper cylinder 174 into the extended position 106. In operation, when the AGV 110 arrives at the stopping location of the conveyor station 150, for example, when the stop block 118 of the AGV 110 contacts the stopper end 176 of the adjustable stopper apparatus 170, and the AGV 110 and conveyor station 150 complete the loading and unloading process, the stopper cylinder 174 retracts from the AGV navigation pathway 140, allowing the AGV 110 to travel forward without obstruction. The AGV presence sensor 162 measures whether the AGV 110 remains near the conveyor station 150 and once the AGV 110 clears the conveyor station 150, for example, once the AGV 110 is outside the detection range of the AGV presence sensor 162, the AGV presence sensor 162 signals the adjustable stopper apparatus 170 to extend the stopper cylinder 174 into the extended position 106.

Figure 7A:
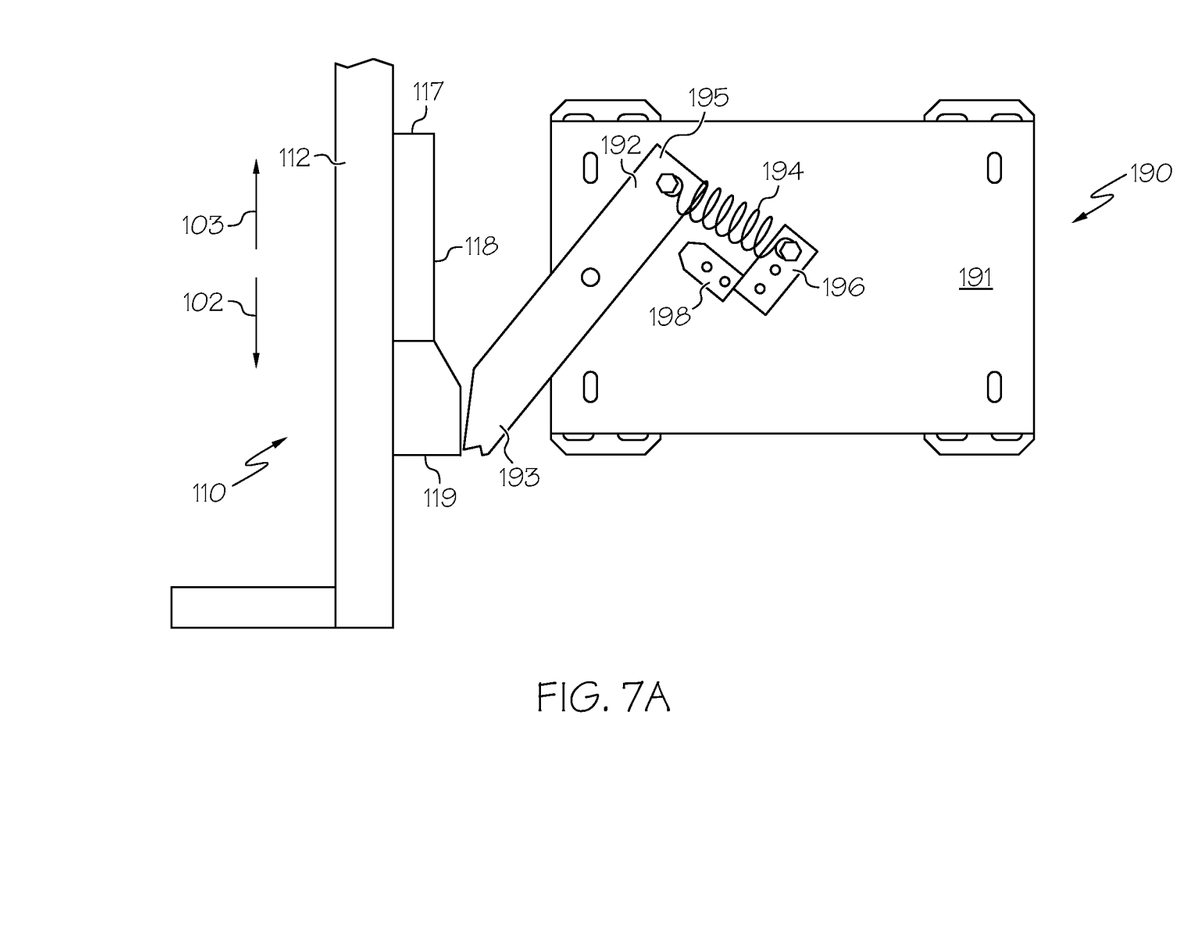
FIG. 7A. depicts a top view of an anti-back mechanism according to one or more embodiments described herein.
Figure 7B:
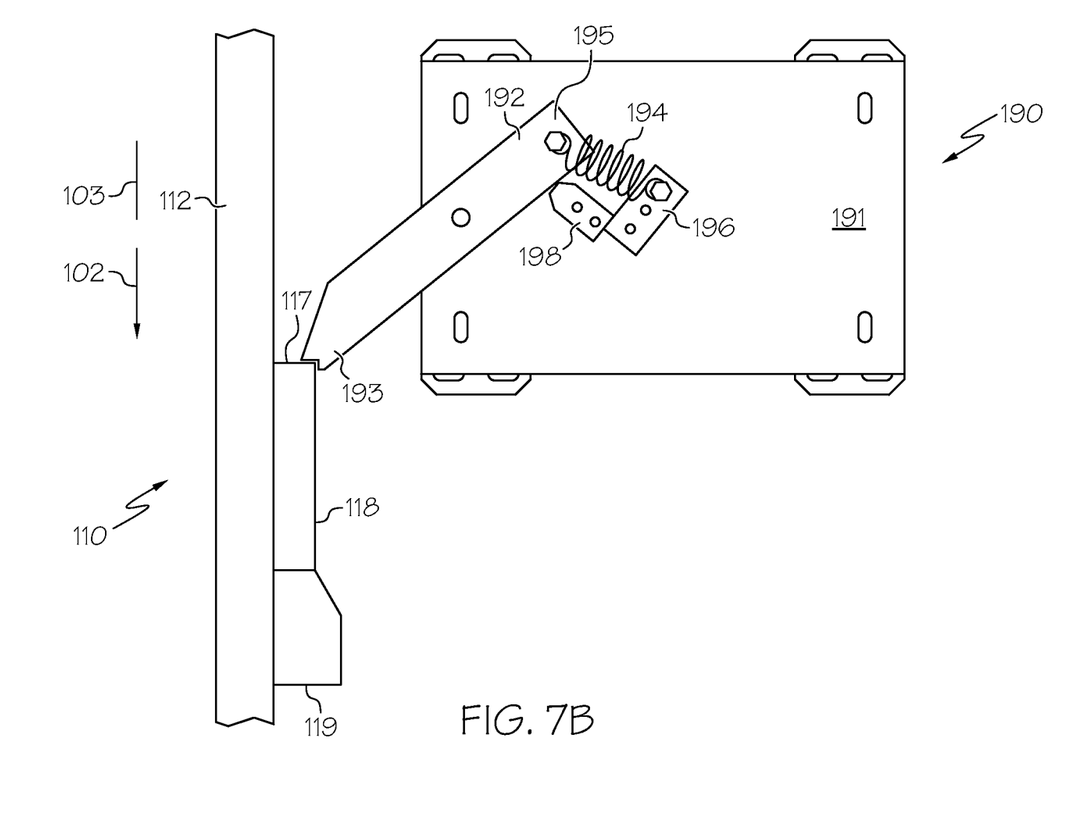
FIG. 7B. depicts another top view of an anti-back mechanism according to one or more embodiments described herein.

Referring now to FIGS. 7A-7B, an anti-back mechanism 190 is depicted. The anti-back mechanism 190 may comprise an anti-back block 192 pivotably mounted on an anti-back mounting surface 191 or pivotably mounted directly to the conveyor station 150, for example, the conveyor frame 152. The anti-back block 192 may comprise a first end 193, extending into the AGV navigation pathway 140, and a second end 195 which may be coupled to an extension spring 194, or other biasing device, which biases the first end 193 of the anti-back block 192 into the AGV navigation pathway 140. The extension spring 194 can be coupled to a spring block return 196 to provide the extension spring 194 with a rigid mounting location. The anti-back mechanism 190 further includes a hard-stop device 198 engageable with the second end 195 of the anti-back block 192 to prevent the anti-back block 192 from pivoting beyond the hard-stop device 198.

In operation, when a stop block 118 of the AGV 110, moving in the forward direction of travel 102, contacts the first end 193 of the anti-back block 192, the anti-back block 192 pivots to allow the AGV 110 to travel past the anti-back block 192, extending the extension spring 194. Once the stop block 118 passes the anti-back block 192, the extension spring 194 retracts and the first end 193 of the anti-back block 192 re-extends into the AGV navigation pathway 140. If the AGV 110 moves in a reverse direction of travel 103, for example, if the AGV 110 reverses from contact with the stopper end 176 (FIG. 1), the rear surface 117 of the stop block 118 contacts the first end 193 of the anti-back block 192 pivoting the second end 195 of the anti-back block 192 into contact with the hard-stop device 198. The hard-stop device 198 prevents motion of the anti-back block 192, providing the AGV 110 a positive stopping device in the reverse direction of travel 103.

Referring now to FIGS. 8 and 9, the adjustable stopper apparatus 170 is mounted on a standalone floor mount 180, positioned on the factory floor 104 along the AGV navigation pathway 140. The standalone floor mount 180 may comprise a standalone base plate 182 mounted on one or more standalone base plate legs 184. The standalone base plate 182 can provide a mounting location for the adjustable stopper apparatus 170. The standalone floor mount 180 may also provide a mounting location for a sensor mount 164. The sensor mount 164 provides a mounting location for one or more sensors, for example, an AGV presence sensor 162. The standalone floor mount 180 may also include a standalone floor mount communications device communicatively coupled to the adjustable stopper apparatus 170 and the AGV communication device 124 (FIG. 3). In some embodiments, the standalone floor mount communications device may signal the adjustable stopper apparatus 170 to move between the extended position 106 and the retracted position 108 and signal the AGV 110 to move in the forward direction of travel 102. In some embodiments, the standalone floor mount 180 is positioned adjacent the conveyor station 150. In other embodiments, the standalone floor mount 180 may be positioned at other locations along the AGV navigation pathway 140.

Operation of the AGV system 100 will now be discussed in reference to FIGS. 1 and 2. As discussed previously, the adjustable stopper apparatus 170 may be positioned relative to the conveyor station 150 and is moveable between an extended position 106 and a retracted position 108. The adjustable stopper apparatus 170 is depicted in FIG. 1 in an extended position 106 and depicted in FIG. 2 in a retracted position 108. The adjustable stopper apparatus 170 may provide a positive stopping location to provide additional accuracy and repeatability of locating the AGV 110 along the factory floor 104 when the AGV 110 is stopped at the conveyor station 150.

In operation, the adjustable stopper apparatus 170 is positioned in the extended position 106 as the AGV 110 approaches the adjustable stopper apparatus 170. If the AGV 110 has not stopped when it reaches the adjustable stopper apparatus 170, the engagement surface 119 of the stop block 118 engages with the stopper end 176 of the adjustable stopper apparatus 170, stopping the AGV 110. It should be understood that the adjustable stopper apparatus 170 may be used together with the slow tape 144 and the stop tape 146 (FIGS. 4-5), for example, as a back-up device when the AGV 110 does not respond to the stop tape 146. Once the AGV 110 is stopped, the AGV communications device 124 signals the conveyor station communications device 160 that the AGV 110 is ready for the loading and unloading process. Once the loading and unloading process is complete, the conveyor station communications device 160 signals the adjustable stopper apparatus 170 to retract from the AGV navigation pathway 140. When the stopper cylinder 174 is in the retracted position 108, the conveyor station communications device 160 sends the AGV communications device 124 a signal to move in the forward direction of travel 102. With the stopper cylinder 174 retracted, the AGV 110 has clearance to drive forward along the AGV navigation pathway 140 without obstruction. Once the AGV 110 leaves the conveyor station 150, for example, when the AGV presence sensor 162 is unable to detect the AGV 110 or detects that the AGV 110 has progressed beyond the adjustable stopper apparatus 170, the stopper cylinder 174 re-extends into the AGV navigation pathway 140. It should be understood that this operation is repeatable for multiple AGVs 110 and can be performed at multiple conveyor stations 150.

In some embodiments, the adjustable stopper apparatus 170 is positioned alongside an AGV navigation pathway 140, for example a loop running automated guided vehicle navigation pathway. In these embodiments, the adjustable stopper apparatus 170 can translate laterally relative to the loop running automated guided vehicle navigation pathway to provide a positive stopping location for an AGV 110. In alternative embodiments, the adjustable stopper apparatus 170 is positioned within an AGV navigation pathway 140, for example a bidirectional automated vehicle navigation pathway. In these embodiments, the adjustable stopper apparatus 170 can be mounted on or positioned within the factory floor 104 such that an AGV 110 can travel above the adjustable stopper apparatus 170 when the stopper end is in the retracted position 108. In this embodiment, the adjustable stopper apparatus 170 can translate vertically within the AGV navigation pathway 140 such that it can engage with a stop block 118 and provide a positive stopping location for an AGV 110.

It should now be understood that AGV systems incorporating adjustable stopper apparatuses can be positioned along an AGV navigation pathway to provide a positive stopping system for one or more AGVs. The adjustable stopper apparatuses can be mounted on conveyor stations or positioned near conveyor stations to positively stop AGVs at the conveyor stations. The adjustable stopping apparatuses include a stopper cylinder moveable within a stopper base and coupled to a stopper end. The stopper cylinder can be moved between an extended position, such that the stopper end is positioned within the AGV navigation pathway, and a retracted position, such that the stopper end is removed from the AGV navigation pathway. When the stopper cylinder is in the extended position, a stop block of the AGV moving in a forward direction of travel can contact the stopper end stopping the AGV. When the stopper cylinder is in the retracted position, the AGV can continue moving in the forward direction of travel unobstructed.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A positive stopping system comprising:
    an adjustable stopper apparatus positioned along an automated guided vehicle navigation pathway, the adjustable stopper apparatus comprising:
        a linear actuator moveable between an extended position and a retracted position; and
        a stopper end coupled to the linear actuator, wherein the stopper end is positioned within the automated guided vehicle navigation pathway when the linear actuator is in the extended position and the stopper end is removed from the automated guided vehicle navigation pathway when the linear actuator is in the retracted position.

2. The positive stopping system of claim 1, wherein the adjustable stopper apparatus further comprises a stopper cylinder.

3. The positive stopping system of claim 1, wherein the stopper end is engageable with a stop block of an automated guided vehicle.

4. The positive stopping system of claim 3, wherein the stopper end provides resistance to the stop block of the automated guided vehicle preventing the automated guided vehicle from traveling in a forward direction of travel.

5. The positive stopping system of claim 1, wherein the stopper end further comprises a cushioning device coupled to the linear actuator and configured to provide dampening.

6. The positive stopping system of claim 1, wherein further comprising a conveyor station having a conveyor frame.

7. The positive stopping system of claim 6, wherein an anti-back mechanism is coupled to the conveyor station, the anti-back mechanism comprising an anti-back block that is pivotable when contacted by an automated guided vehicle in a forward direction of travel and immobile when contacted by the automated guided vehicle in a reverse direction of travel.

8. The positive stopping system of claim 6, wherein the conveyor station further comprises a conveyor station communications device adapted to transmit control signals to the adjustable stopper apparatus signaling the adjustable stopper apparatus to move the linear actuator to the extended position or the retracted position.

9. The positive stopping system of claim 6, wherein the conveyor station further comprises an automated guided vehicle presence sensor configured to detect whether an automated guided vehicle is located at the conveyor station.

10. The positive stopping system of claim 9, wherein the automated guided vehicle presence sensor is communicatively coupled to the adjustable stopper apparatus such that when the automated guided vehicle presence sensor detects that the automated guided vehicle is not located at the conveyor station, the linear actuator of the adjustable stopper apparatus moves into the extended position.

11. An automated guided vehicle system comprising:
    an automated guided vehicle comprising a vehicle frame, a drive mechanism, a sensing head, and a stop block coupled to the vehicle frame;
    a conveyor station comprising a conveyor frame; and
    an adjustable stopper apparatus mounted on the conveyor station, the adjustable stopper apparatus comprising:
        a linear actuator moveable between an extended position and a retracted position; and
        a stopper end coupled to the linear actuator, wherein the stopper end is positioned within an automated guided vehicle navigation pathway when the linear actuator is in the extended position and the stopper end is removed from the automated guided vehicle navigation pathway when the linear actuator is in the retracted position; and wherein when the linear actuator is in the extended position, the stopper end is engageable with the stop block of the automated guided vehicle and when the linear actuator is in the retracted position, the automated guided vehicle navigation pathway is unobstructed.

12. The automated guided vehicle system of claim 11 further comprising an anti-back mechanism is coupled to the conveyor station, the anti-back mechanism comprising an anti-back block that is pivotable when contacted by the automated guided vehicle in a forward direction of travel and immobile when contacted by the automated guided vehicle in a reverse direction of travel.

13. The automated guided vehicle system of claim 11, wherein the automated guided vehicle further comprises an automated guided vehicle communications device and the conveyor station further comprises a conveyor station communications device.

14. The automated guided vehicle system of claim 13, wherein the automated guided vehicle communications device and the conveyor station communications device are commutatively coupled when the automated guided vehicle is stopped at a conveyor station stopping location.

15. The automated guided vehicle system of claim 13, wherein the conveyor station communications device is adapted to transmit control signals to the adjustable stopper apparatus signaling the adjustable stopper apparatus to move the linear actuator to the extended position or the retracted position.

16. The automated guided vehicle system of claim 11, wherein the automated guided vehicle navigation pathway further comprises a slow tape detectable with the sensing head of the automated guided vehicle to signal the automated guided vehicle to reduce speed.

17. The automated guided vehicle system of claim 11, wherein the automated guided vehicle navigation pathway further comprises a stop tape detectable with the sensing head of the automated guided vehicle adapted to provide a stop signal to the automated guided vehicle.

18. A method of navigation assistance, the method comprising:

extending a linear actuator of an adjustable stopper apparatus into an automated guided vehicle navigation pathway wherein the adjustable stopper apparatus is coupled to a conveyor station;

approaching the conveyor station with an automated guided vehicle following the automated guided vehicle navigation pathway, wherein the automated guided vehicle comprises a vehicle frame, a drive mechanism, and a stop block coupled to the vehicle frame;

engaging the stop block of the automated guided vehicle with the linear actuator of the adjustable stopper apparatus;

stopping the automated guided vehicle; and retracting the linear actuator of the adjustable stopper apparatus from the automated guided vehicle navigation pathway.

19. The method of navigation assistance of claim 18, the method further comprising:

detecting, with an automated guided vehicle presence sensor, whether the automated guided vehicle is located at the conveyor station; and extending the linear actuator of the adjustable stopper apparatus into an extended position if the automated guided vehicle is not located at the conveyor station.

20. The method of navigation assistance of claim 18, wherein the conveyor station further comprises an anti-back mechanism, the anti-back mechanism comprising an anti-back block that is pivotable when contacted by the automated guided vehicle in a forward direction of travel and immobile when contacted by the automated guided vehicle in a reverse direction of travel.

* * * * *